United States Patent [19]

Berrier et al.

[11] Patent Number: 5,223,375
[45] Date of Patent: Jun. 29, 1993

[54] FLEXOGRAPHIC PRINTING PLATE COMPRISING PHOTOSENSITIVE ELASTOMER POLYMER COMPOSITION

[75] Inventors: Arthur L. Berrier; Rustom S. Kanga, both of Ellicott City, Md.

[73] Assignee: W. R. Grace & Co.-Conn., New York, N.Y.

[21] Appl. No.: 729,976

[22] Filed: Jul. 15, 1991

[51] Int. Cl.$^5$ ............................................. G03C 1/68
[52] U.S. Cl. ............................... 430/281; 430/286; 430/288; 430/300
[58] Field of Search ............... 430/281, 288, 286, 907, 430/300; 522/6

[56] References Cited

U.S. PATENT DOCUMENTS

| | | | |
|---|---|---|---|
| 4,045,231 | 2/1977 | Toda et al. | 96/115 P |
| 4,112,207 | 9/1978 | Jones | 526/17 |
| 4,162,919 | 1/1979 | Richter et al. | 97/87 R |
| 4,179,531 | 3/1979 | Hein et al. | 430/300 |
| 4,245,027 | 1/1981 | Takeda et al. | 430/141 |
| 4,271,259 | 7/1981 | Breslow et al. | 430/286 |
| 4,272,610 | 7/1981 | Breslow et al. | 430/302 |
| 4,323,637 | 4/1982 | Chen et al. | 430/271 |
| 4,430,417 | 8/1984 | Heinz et al. | 430/286 |
| 5,089,368 | 2/1992 | Kato et al. | 430/96 |

FOREIGN PATENT DOCUMENTS 52-38441 9/1977 Japan .

OTHER PUBLICATIONS

Morrison et al. Organic Chemistry, 3rd Ed., p. 456 (1973).
Boucher et al, "Kinetics and Mechanism of the Quaternization of Poly(4-vinylpyridine) with Ethyl, n-Propyl, n-Butyl, n-Hexyl and Benzyl Bromide in Sulfolane", J. Chem. Society, Faraday Trans. I, 73, 1629–1635 (1977).
Chem. Abs. 88 (2) 7524z, Fielding-Russell et al. (1977).
Chem. Abs. 101 (6), 39114u, Kudose et al. (1984).
Chem. Abs. 103 (20) 166031f, Lelah et al. (1985).
Chem. Abs. 104 (20) 169705k, Y. Miyaki (1985).
Chem. Abs. 109 (10) 74182b, Shimazaki et al (1988).
Chem. Abs. 111 (6) 39978k, Moeller et al (1989).
Chem. Abs. 111 (16) 134883j, Ohnuma et al (1989).
Soum et al, "Synthesis and Characterization of New Block Copolymers of Butadiene and 2-isopropenylpyridine", Polymer, 29, 1528–1534 (Aug. 1988).
Jacovic, M. S., "Ionomer-like Materials Based on 4-vinylpyridine Copolymers", Makromol. Chem., Rapid Commun., 10, 217–225, especially at 219–220 (1989).

*Primary Examiner*—Marion E. McCamish
*Assistant Examiner*—Rosemary Ashton
*Attorney, Agent, or Firm*—Valerie E. Looper

[57] ABSTRACT

Flexographic photosensitive printing plates are made with formulations comprising triblock polymers of poly(vinylpyridine)-poly(butadiene) or poly(isoprene)-poly(vinylpyridine). The polymers may be quaternized. When made with quaternized polymers, the plates after imaging with UV may be developed in aqueous solutions.

7 Claims, No Drawings

FLEXOGRAPHIC PRINTING PLATE COMPRISING PHOTOSENSITIVE ELASTOMER POLYMER COMPOSITION

FIELD OF THE INVENTION

This invention relates to radiation curable polymer formulations, as well as photosensitive articles having solid surfaces or layers prepared from such formulations. The invention also relates to a new class of compounds useful in making such formulations.

BACKGROUND OF THE INVENTION

Triblock copolymers having poly(4-vinylpyridine) end blocks and a polybutadiene center block can be prepared by sequential anionic polymerization of butadiene and of 4-vinylpyridine using an organolithium initiator; see M. S. Jacovic, "Ionomerlike materials based on 4-vinylpyridine copolymers," Maromol. Chem., Rapid Commun, vol. 10, 217–225 (1989).

Quaternization of triblock polymers of polystyrene-polybutadiene-polyvinylpyridine is disclosed by Ohnuma et al. in Chemical Abstracts, 111(16):134883 (1989).

Quaternization of poly(4-vinylpyridine) is known: Boucher et al., "Kinetics and Mechanism of the Quaternization of Poly(4-vinylpyridine) with Ethyl, n-Propyl, n-Butyl, n-Hexyl and Benzyl Bromide in Sulfolane", J. Chem. Soc. Faraday Trans. I, 73, pp. 1629–1635 (1977).

Diblock and triblock copolymers of butadiene and 2-isopropenylpyridine have been synthesized by anionic polymerization, using a difunctional lithium initiator: Soum et al., "Synthesis and Characterization of New Block Copolymers of Butadiene and 2-isopropenylpyridine," Polymer, vol. 29, pp. 1528–1534 (August, 1988).

Triblock copolymers of polystyrene-polybutadiene (or polyisoprene)-polystyrene have been used in the preparation of photosensitive printing plates: U.S. Pat. No. 4,323,637, Chen et al., "Use of Cover Sheet and Interposed Flexible Film with Block Copolymer Compositions" (1982). The copolymers were not quaternized, nor were the resulting formulations water-developable.

As noted (e.g., U.S. Pat. No. 4,045,231 et al.) triblock polymers of the type polystyrene-polybutadienepolystyrene have been used in printing plates, but have not been quaternized. Such plates are not water-developable. We have discovered that plates made with polymers of the type polyvinylpyridine-polybutadiene or polyisoprene-polyvinylpyridine are water-developable. So far as can be determined, quaternized triblock polymers of the type XYX (i.e., a central block polymer terminated on each end by two identical polymer blocks) were unknown prior to this invention.

U.S. Pat. No. 4,162,919, Richter et al. (1979), discloses a 2-block copolymer of styrene-isoprene (or butadiene) for use in flexographic printing plates.

U.S. Pat. No. 4,245,027, Takeda et al. (1981), discloses a photosensitive composition comprising copolymers of vinylpyridine and a polyvinylidene halide, optionally with an olefin, e.g., butadiene or isoprene, plus a light sensitizing element, e.g., iodoform, quinones, or diazonium salts, capable of forming a quaternary salt with the polyvinylpyridine on heating or on exposure to actinic light. The instant invention differs, inter alia, in that our triblock copolymer has no polyvinylidene component, and further in that when we quaternize it is prior to formulation and exposure.

U.S. Pat. Nos. 4,271,259 and 4,272,610, both to Breslow et al. (1981), disclose a copolymer of butadiene or isoprene with vinyl pyridine as a component in a photosensitive composition. The copolymer is not specified as ABA, and it is not quaternized. The composition requires an oxidizable component containing allylic hydrogen and a photooxygenation sensitizer.

U.S. Pat. No. 4,430,417, Heinz et al. (1984), discloses ABA triblock copolymers in making flexographic printing plates. A is styrene-butadiene, B is isoprene.

U.S. Pat. No. 4,179,531, Hein (1979), discloses ABA triblock copolymers ("Kraton"(R) - Shell Chemical Co.) in making printing plates where A is a styrene and B is a diene such as isoprene or butadiene. A polythiol is required in the formulation.

U.S. Pat. No. 4,045,231, Toda et al. (1977), discloses a styrene-butadiene-styrene triblock copolymer in a printing plate formulation.

Chem. Abstracts 111(6):39978k, Moeller et al., discloses iodine doped AB diblock copolymers of poly(2-vinylpyridine) and either polybutadiene or polystyrene.

Chem. Abstracts 109(10):74182b, Shimazaki et al., discloses triblock copolymer, polystyrenepolyisoprene-poly(vinylpyridine) quaternized with chloromethylstyrene. Use in photosensitive compositions is not disclosed.

Chem. Abstracts 104(20):169705k, Y. Mihaki, discloses isoprene-styrene-4-vinylbenzyldimethylamine block copolymers treated with di-iodopropane to prepare an amphoteric ion exchanger.

Chem. Abstracts 103(20):166031f, Lelah et al., discloses quaternization of triblock poly(styrenebutadiene-4-vinylpyridine), with crosslinking of the butadiene segment and sulfonation of the styrene block.

Chem. Abstracts 101(6):39114u, Kudose et al., discloses quaternizing triblock butadiene-styrene-4-vinylpyridine copolymer with methyl bromide.

Chem. Abstracts 88(2):75242, Fielding-Russell et al., discloses HCl quaternization of butadienestyrene-2-vinylpyridine block copolymer.

SUMMARY OF THE INVENTION

It is an object of the invention to prepare flexographic printing plates using formulations comprising triblock polymers of the type ABA or A'BA' where A is an unquaternized poly(vinylpyridine) consisting of repeating segments of the Structure

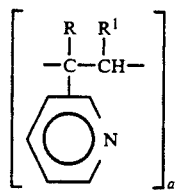

It is also an object of the invention to prepare a new class of compounds, viz., quaternized triblock polymers of the structure A'BA', where:

A' is a quaternized poly(vinylpyridine) consisting of repeating segments of the structure

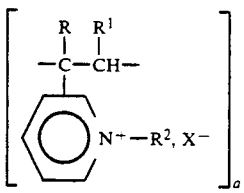

B is a poly(alkadiene) consisting of repeating segments of the structure

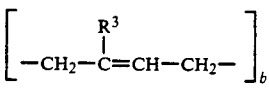

X is a leaving group;
R, $R^1$, and $R^3$ are independently H or 1-8 carbon-alkyl;
$R^2$ is H, 1-8 carbon alkyl, or aralkyl;
a has a value in the range of about 50-1,000;
b has a value in the range of about 500-10,000.

It is a further object of the invention to prepare a photosensitive flexographic printing plate using the aforesaid ABA and A'BA' polymers.

It is also an object to prepare a water-developable printing plate.

Another object is to prepare a thermoplastic elastomeric block polymer designed with a hydrophilic terminal block and which has good physical properties and water dispersibility.

A further object is to provide a triblock polymer or prepolymer with an internal block which is a polymer of high enough molecular weight to provide elastomeric behavior, and where the terminal blocks provide water washability to the resultant triblock polymer.

The term "leaving group" is used in the conventional sense, e.g., as explained in Morrison and Boyd, Organic Chemistry, Third Ed., published by Allyn and Bacon, Inc., p. 456 (1973). As there described, alkyl halides typically react readily in nucleophilic substitutions, e.g., "R:X + →R:Z + :Z⁻ where :Z is a nucleophilic reagent (such as vinyl pyridine), R:Z is (in such case) quaternized vinylpyridine, and X is the leaving group. Although in the instant invention X is typically halide (F, Cl, Br, I), $R^2X$ can be any compound containing a leaving group, e.g. $R^2$-methane sulfonate; $R^2$-trifluoroacetate; $R^2$-trifluoromethane sulfonate; and the like.

Molecular weights are number average and are determined by comparison with a polyisoprene standard of known $M_n$ by the gel permeation chromatography technique.

DETAILED DESCRIPTION OF THE INVENTION

The invention is directed to certain triblock polymers and their use in making photosensitive printing plates. In a preferred embodiment, the invention includes a novel class of triblock polymers and their use in making printing plates developable in water.

The novel compounds are quaternized polyvinylpyridine-polyalkadiene-polyvinylpyridine triblock copolymers of the structure A'BA', where A' and B are as above defined.

Both the ABA and A'BA' compounds can be formulated in a solvent with photosensitive unsaturated compounds (e.g., reactive monomers such as acrylates and photoinitiators, and the solution can be solvent cast on flexographic plate backings. Alternatively, solvent-free formulations using ABA or A'BA' polymers may be extruded as photo-sensitive films.

Reagents required in carrying out the invention are described below.

The ABA Triblock Polymers

The starting ABA triblock polymers that are quaternized by the invention process are in general well know, and can be prepared by known processes. Sequential addition polymerization using a lithium initiator is considered especially useful, as described by Jacovic and by Soum et al., op. cit. These triblock polymers have the structure ABA, where A and B are as above defined. Additional details for their preparation are given below.

In preferred embodiments A is a segment from poly(4-vinylpyridine) or from poly(2-vinylpyridine) and B a segment from polyisoprene or polybutadiene; a is about 70-475 and for isoprene b is about 1000-5000 and for butadiene b is about 1200-6000.

Vinylpyridine is available in various position isomers and with varied substituents. Substantially all are useful in preparing the invention polymers.

The Quaternizing Compound $R^2X$

A variety of quaternizing materials is available for quaternizing the pyridine nitrogen, including the 1-8 carbon alkyl halides, e.g., methyl iodide, methyl bromide, ethyl chloride and the like; and aralkyl halides, e.g., benzyl bromide, benzyl chloride, and the like. Alkyl or aralkyl sulfonates are useful. Substantially any conventional quaternizing compound is considered workable in the invention. Alkylating agents are generally effective. Broadly speaking, compounds $R^2X$ where X is a leaving group are operable. See "Summary of the Invention", above.

The Quaternization Process

Quaternization proceeds conventionally, using solvents, temperatures, reagent proportions, and reaction times similar to those used in typical quaternizations of the prior art.

Preferred conditions for the quaternization of reaction of the invention include:
Solvent: chloroform, toluene, methylene chloride, chloroform, methanol, benzene, tetrahydrofuran, and ethylene chloride. The solvent is not critical. Substantially any solvent that dissolves the initial ABA polymer and dissolves or disperses the quaternized product A'BA' is suitable.
Proportions: Stoichiometric excess of quaternizing compound over triblock polymer.
Quaternization reaction time: about 1-24 hours.
Quaternization reaction temperature: about 0°-60° C.

Following quaternization, the solvent may be stripped under reduced pressure to yield solvent-free product, or, if desired, the solution may be used directly in preparing the printing plate formulation.

Formulations

For use in printing plates, the invention employs two types of formulations. One type is for solvent casting and uses a solvent. The other is for extrusion and is solvent-free. For solvent casting, the triblock polymer, ABA or A'BA', is dissolved in a solvent for further processing. In the case of A'BA', it can be left in the same solvent in which it was quaternized. To this solution is added a photosensitive unsaturated compound (typically an acrylate), and a photoinitiator. This solution can be solvent cast to produce a photopolymer plate, which can then be imaged and developed to produce solid printing plates. Development can be by water and/or solvent.

Thus, a formulation for solvent casting will include:
(1) Triblock polymer, ABA or A'BA';
(2) A solvent, including those solvents useful in the quaternizing process, e.g., methylene chloride, chloroform, toluene, methanol, benzene, tetrahydrofuran, ethylene chloride, etc.;
(3) A photosensitive unsaturate compound, as described below; and
(4) A photoinitiator, as described below.

The Photosensitive Unsaturated Compound

This material is a reactive monomer, typically an acrylate Useful acrylates include those of the formula:

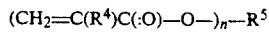

$(CH_2=C(R^4)C(:O)-O-)_n-R^5$ where $R^4$ is H or methyl and $R^5$ is an organic moiety having a valence of n, and n is 1 or more.

Such reactive monomers include, but are not limited to, trimethylolpropane triacrylate, hexanediol diacrylate, 1,3-butylene glycol diacrylate, diethylene glycol diacrylate, 1,6-hexanediol diacrylate, neopentyl glycol diacrylate, polyethylene glycol-200 diacrylate, tetraethylene glycol diacrylate, triethylene glycol diacrylate, pentaerythritol tetraacrylate, tripropylene glycol diacrylate, ethoxylated bisphenol-A diacrylate, trimethylolpropane triacrylate, di-imethylolpropane tetraacrylate, triacrylate of tris(hydroxyethyl) isocyanurate, dipentaerythritol hydroxypentaacrylate, pentaerythritol triacrylate, ethoxylated trimethylolpropane triacrylate, triethylene glycol dimethacrylate, ethylene glycol dimethacrylate, tetraethylene glycol dimethacrylate, polyethylene glycol-200 dimethacrylate, 1,6-hexanediol dimethacrylate, neopentyl glycol dimethacrylate, polyethylene glycol-600 dimethacrylate, 1,3-butylene glycol dimethacrylate, ethoxylated bisphenol-A dimethacrylate, trimethylolpropane trimethacrylate, diethylene glycol dimethacrylate, 1,4-butanediol diacrylate, diethylene glycol dimethacrylate, pentaerythritol tetramethacrylate, glycerin dimethacrylate, trimethylolpropane dimethacrylate, pentaerythritol trimethacrylate, pentaerythritol dimethacrylate, pentaerythritol diacrylate, urethanemethacrylate or acrylate oligomers and the like which can be added to the photopolymerizable composition to modify the cured product. Monoacrylates such as cyclohexyl acrylate, isobornyl acrylate, lauryl acrylate and tetrahydrofurfuryl acrylate and the corresponding methacrylates are also operable as reactive diluents.

Photoinitiators

The formulations comprising the novel materials of this invention require a photoinitiator. A large number are available and useful.

Photoinitiators for the photocurable composition include the benzoin alkyl ethers, such as benzoin methyl ether, benzoin ethyl ether, benzoin isopropyl ether and benzoin isobutyl ether. Another class of photoinitiators are the dialkoxyacetophenones exemplified by 2,2-dimethoxy-2-phenylacetophenone, i.e., Irgacure ® 651 (Ciba-Geigy); and 2,2-diethoxy-2phenylacetophenone. Still another class of photoinitiators are the aldehyde and ketone carbonyl compounds having at least one aromatic nucleus attached directly to the carboxyl group. These photoinitiators include, but are not limited to, benzophenone, acetophenone, o-methoxybenzophenone, acenaphthenequinone, methyl ethyl ketone, valerophenone, hexanophenone, alpha-phenylbutyrophenone, p-morpholinopropiophenone, dibenzosuberone, 4-morpholinobenzophenone, 4'-morpholinodeoxybenzoin, p-diacetylbenzene, 4-aminobenzophenone, 4'-methoxyacetophenone, benzaldehyde, alpha-tetralone, 9-acetylphenanthrene, 2-acetylphenanthrene, 10-thioxanthenone, 3-acetylphenanthrene, 3-acetylindone, 9-fluorenone, 1-indanone, 1,3,5-triacetylbenzene, thioxanthen-9-one, xanthene-9-one, 7-H-benz[de]-anthracene-7-one, 1-naphthaldehyde, 4,4'-bis(dimethylamino)-benzophenone, fluorene-9-one, 1'-acetonaphthone, 2'-acetonaphthone, 2,3-butanedione, acetonaphthene, benz[a]anthracene 7.12 dione, etc. Phosphines such as triphenylphosphine and tri-o-tolylphosphine are also operable herein as photoinitiators.

Other Additives

Other additives to the photocurable composition can be included. To inhibit premature crosslinking during storage of the prepolymer containing compositions of this invention, thermal polymerization inhibitors and stabilizers are added. Such stabilizers are well known in the art, and include, but are not limited to, hydroquinone monobenzyl ether, methyl hydroquinone, amyl quinone, amyloxyhydroquinone, n-butylphenol, phenol, hydroquinone monopropyl ether, phenothiazine and nitrobenzene, and mixtures thereof. Such additives are used in an amount within the range of from about 0.01 to about 2% by weight of the prepolymer. These stabilizers are effective in preventing crosslinking of the prepolymer composition during preparation, processing and storage.

The compositions also may contain up to about 50% by weight of an inert particulate filler which is essentially transparent to actinic light. Such fillers include the organophilic silicas, bentonites, silica and powdered glass. Such fillers can impart desirable properties to the photocurable compositions and reliefs on printing plates containing those compositions.

Summarizing, formulations using the herein described polymers suitably include the following (in parts by weight):
(1) Triblock polymer, optionally quaternized, about 50–99, preferably about 75–95;
(2) Photosensitive unsaturated compound, about 0.1–50, preferably about 0.1–20;
(3) Photoinitiator, about 0.01–5.0, preferably about 0.1–3.0.

Additionally the formulation contains enough solvent to dissolve the above materials.

For extrusion, the solvent in omitted.

Preparation of Plate

The photocurable compositions comprising polymer ABA or A'BA' can be shaped and formed as a solid layer of suitable thickness according to conventional solvent casting, i.e., dissolving the composition in a solvent, shaping the solution into a film or plate, and removing the solvent, e.g., by oven-drying. Alternately, conventional extrusion calendaring or hot press techniques can be used. Solid layers of the photosensitive composition in the form of a film can be adhered to supports such as those comprising polyester, nylon, or polycarbonate. Other suitable supports include woven fabrics and mats, e.g., glass fiber fabrics or laminated materials made of, for example, glass fibers and plastics; and steel or aluminum coated plates. It is preferred that the supports be dimensionally stable and resistant to the washout solutions.

It may be desirable to protect the photosensitive surfaces from contamination by dirt and dust during storage before being exposed and washed. Such protection may be accomplished by application of a flexible protective cover sheet to the side of the photocurable composition opposite that of the support. In addition, the photocurable compositions can sometimes be tacky, and in such case it may be desirable to apply a release film to the surface of the photosensitive layer before application of the coversheet. The release film may consist of a thin, flexible, water-dispersible polymeric film placed in intimate contact on the surface of the photocurable composition. Such release films are well known in the art.

Exposure and Development

Photosensitive articles comprising a support having a solid layer or surface comprising the invention photocurable compositions, e.g., solid flexographic printing plates, can be processed by well known techniques for imagewise exposure to actinic light. Preferably, the light should have a wavelength of about 230-450 microns. Exposure is through a negative placed between the light source and the photosensitive surface. Suitable sources of light include Type RS sunlamps, carbon arc lamps, xenon arc lamps, mercury vapor lamps, tungsten halide lamps, and the like.

Exposure periods depend upon the intensity of the actinic light, thickness of the plate, and the depth of the relief desired on the printing plate. Exposure periods of from 2 to 20 minutes are generally suitable.

After exposure and removal of the negative, the unexposed areas of the photosensitive surface can be developed in washout solutions as herein described. As noted, a preferred washout solution for plates containing A'BA' polymer is a dilute aqueous surfactant solution. Plain water (preferably warm) is also useful (preferably with brushing). This feature is particularly advantageous in that it avoids problems of disposing of washout solutions containing organic solvents. Washout solvents recommended for developing ABA-type plates (i.e., using unquaternized copolymers) include toluene and tetrachloroethylene.

The following Examples illustrate without limiting the invention.

EXAMPLES 1-8

Preparation of ABA Block Copolymers

As noted above, materials and methods for the preparation of the ABA copolymers used in this invention are known. However, to facilitate an understanding of our techniques, we offer below the methods that we used to prepare the starting ABA triblock copolymers.

The poly(vinylpyridine)/polyisoprene and poly(4-vinylpyridine)/polyisoprene ABA block copolymers were prepared by the sequential addition of isoprene and vinylpyridine to a difunctional organolithium initiator in benzene. The benzene solvent was distilled prior to use from the sodium ketyl of benzophenone. Monomers were distilled from calcium hydride prior to use. The polymerizations were carried out in oven-dried round-bottom flasks under dry argon atmosphere.

The difunctional initiator was prepared by dissolving bis[4-(1-phenylvinyl)phenyl]ether or 1,3-diisopropenylbenzene in 500 ml of dry benzene and adding 2 equivalents of sec-butyllithium.

The isoprene midblock was prepared by the addition of isoprene to the difunctional organolithium initiator. The end blocks were prepared by the addition of 2- or 4-vinylpyridine to the living polyisoprenyl lithium dianion. The living polymer was terminated by the addition of degassed methanol (2 ml) and was precipitated by adding the polymer solution to a large excess of methanol. The reaction conditions used in the above steps for Examples 1-8 are given in Table 2.

A butadiene or other alkadiene midblock may be prepared in essentially the same way.

Referring to Table 1, "a" and "b" may be readily calculated from the data. Thus, in Example 8, to determine "b", "Mn" of the polyisoprene midblock was found to be 155,000 (GPC, polyisoprene standards). Dividing the "Mn" with the molecular weight of isoprene (68.12) gives 2275 = "b".

To determine "a", we can find the total weight of vinylpyridine incorporated into the block copolymer from the "wt % VP" (19.3%) and the weight of isoprene (30.65 g). This calculation gives 7.33 g. Vinylpyridine in the sample which divided by the molecular weight (105.14 g/mole) gives moles of vinylpyridine (0.07). Moles of vinylpyridine divided by moles of the initiator ($7.01 \times 10^{-4}$ moles) gives 100 and since there are 2 endblocks we get $100 \times 2 = 200$ which is the value of "a". The total molecular weight is thus $155,000 + 2 \times 100 \times 105.14 = 176,000$. These figures are approximate.

TABLE 1[1]

| Ex. | Vinyl Position | Initiator[2] Reaction Conditions | | Isoprene Rection Conditions | | Vinylpyridine Reaction Conditions | | $M_n$[3] | MWD | Wt %[5] VP | Isoprene Microstructure[5], wt % | |
|-----|----|--------|---------|-------|-------|-------|-------|-----|------|------|------|-----|
|     |    | g.     | °C./hr  | g.    | °C.hr | g.    | °C./hr|     |      |      | 1,4  | 3,4 |
| 1 | 4 | 0.1904 | 50/1    | 30.65 | 45/1.5 | 11.70 | 25/0.5 | 195 | 1.77 | 19.8 | 93.7 | 7.0 |
| 2 | 4 | 0.1887 | 50/1    | 30.65 | 45/3   | 12.3  | 5/0.5  | 217 | 1.47 | 28.3 | 92.7 | 7.3 |
| 3 | 4 | 0.2821 | 60/1.75 | 30.65 | 45/3   | 13.31 | 5/1    | 194 | 1.49 | 24.3 | 91.9 | 8.1 |
| 4 | 2 | 0.1889 | 65/1.75 | 27.24 | 45/3   | 13.11 | 5/1    | 343 | 1.37 | 29.5 | 93.0 | 7.0 |
| 5 | 2 | 0.2812 | 65/2    | 30.65 | 45/3   | 6.96  | 5/1    | 151 | 1.62 | 13.2 | 92.0 | 8.0 |
| 6 | 2 | 0.1891 | 65/2.5  | 30.65 | 45/2   | 12.18 | 5/1    | 218 | [4]  | 20.6 | 93.0 | 7.0 |
| 7 | 2 | 0.2647 | 65/2    | 44.27 | 45/2   | 13.90 | 5/1    | 317 | 1.77 | 16.4 | 93.8 | 6.2 |

TABLE 1-continued

| Ex. | Vinyl Position | Initiator[2] Reaction Conditions g. | °C./hr | Isoprene Reaction Conditions g. | °C.hr | Vinylpyridine Reaction Conditions g. | °C./hr | $M_n$[3] | MWD | Wt %[5] VP | Isoprene Microstructure[5], wt % 1,4 | 3,4 |
|---|---|---|---|---|---|---|---|---|---|---|---|---|
| 8 | 2 | 0.1110 | 65/2 | 30.65 | 50/2 | 9.94 | 5/0.5 | 176 | 1.35 | 19.3 | 92.0 | 8.0 |

Notes:
[1]500 ml dried benzene used as solvent in all Examples.
[2]Bis[4-(1-phenylvinyl)phenyl]ether initiator used in Ex's. 1–7; 1,3-diisopropenylbenzene in Ex. 8.
[3]From GPC (polyisoprene standards) × 1000.
[4]Bimodal distribution.
[5]From $^1$H NMR analysis.
MWD = molecular weight distribution; VP = polyvinylpyridine.

EXAMPLES 9-13

Quaternization of Polyvinylpyridine/Polyisoprene ABA Block Copolymers

The quaternization of the polyvinylpyridine/polyisoprene block copolymers was performed by dissolving the polymer in chloroform or toluene/methylethylketone and adding an excess of methyl bromide. The reaction conditions used for Examples 9-13 are given in Table 3. Quaternization of the pyridine ring was verified by IR spectroscopy.

TABLE 2

Quaternization of Polyvinylpyridine/Polyisoprene ABA Block Copolymers

| Ex. | Using Polymer of Ex. No. | Temperature °C. | Time hrs | IR data cm$^{-1}$ |
|---|---|---|---|---|
| 9 | 2 | 0-25 | 14 | 1645 |
| 10 | 4 | 0-25 | 14 | 1630 |
| 11 | 5 | 0-25 | 14 | 1630 |
| 12 | 6 | 0-25 | 14 | 1630 |
| 13 | 8 | 40 | 20 | 1630 |

Notes:
(1) Solvent used in Examples 9-12 was toluene/methylethylketone, 3/1 by volume. Solvent in Example 13 was chloroform, and the reaction was conducted in a sealed glass reactor.
(2) For Example 9-12, the reaction was started at 0° C. and over the course of the reaction, the temperature rose to room temperature, i.e. 25° C.

EXAMPLES 14-19

Formulation of ABA and A'BA' Block Copolymers

The ABA block copolymers or quaternized A'BA' block copolymers as the case may be were formulated with photoinitiator and (meth)acrylate monomers by adding Irgacure ® 651 photoinitiator from Ciba-Geigy, hexanediol dimethacrylate and hexanediol diacrylate to a chloroform or toluene solution of the polymer. The composition of the resulting solutions (calculated on a weight percent, solvent-free basis) was 89% block polymer, 1% photoinitiator, 5% hexanediol dimethacrylate, and 5% hexanediol diacrylate. The solutions were then solvent cast onto a polyester film and dried. The dried films (not imaged, not developed) were cured by exposure to UV light and their mechanical properties evaluated. The results are listed in Table 3.

TABLE 3

| Ex. | Polymer of Ex. No. | Tensile (psi) | Elong. (%) | Mod. (psi) | Shore A (°) | Resilience (%) | Swell Resistance[1] H$_2$O | IPA[2] | EtOH/EtAc[3] | Aq. Ink | Solvent Ink |
|---|---|---|---|---|---|---|---|---|---|---|---|
| 14 | 1 | 370 | 586 | 274 | 39 | 50 | 6 | 36 | 59 | 11 | 61 |
| 15 | 9 | 663 | 217 | 578 | 62 | 56 | 15 | 5 | 13 | 28 | 8 |
| 16 | 10 | 976 | 331 | 778 | 54 | 50 | 25 | 26 | 17 | 40 | 19 |
| 17 | 11 | 362 | 271 | 292 | 46 | 54 | 6 | 9 | 25 | 9 | 15 |
| 18 | 12 | 393 | 248 | 316 | 47 | 49 | 9 | 8 | 30 | 11 | 16 |

Notes:
All polymers were quaternized except in Ex. 14.
Tensile strength (Tensile), Elongation (Elong.), and Tensile modulus (Mod.) (1% elongation) were determined by ASTM D 412.
Shore hardness was determined by ASTM D 2240.
[1]Swell Resistance determined by 24 hour weight gain of 20 mil thick sample.
[2]Isopropyl alcohol.
[3]85 wt % ethanol, 15 wt % ethyl acetate.

EXAMPLE 20

The quaternized poly(4-vinylpyridine)/polyisoprene A'BA' block copolymer of Example 9 was formulated as Example 15 and was solvent-cast to give a 60 mil thick solid photocurable film. This film was actinically exposed to UV light in an image-wise fashion and washed in an aqueous surfactant solution (Triton RW-150) at 120° F. to form a flexographic relief plate. The developed plate showed good reproduction of the negative film image. In the washing operation, a surfactant is not necessary, but is preferred because it speeds the developing process and gives a cleaner plate. Plain water will do.

What is claimed:

1. Photosensitive flexographic printing plate comprising a backing, and thereon a layer of a mixture comprising a triblock polymer of the structure ABA or A'BA', a photosensitive unsaturated compound, and a photoinitiator; where A is

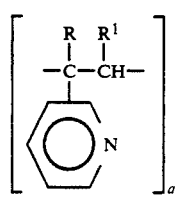

A' is

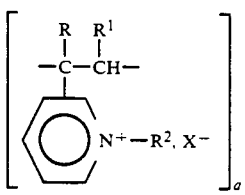

B is

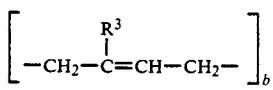

X is a leaving group;
R, R¹, and R³ are independently H or 1–8 carbon alkyl;

$R^2$ is H, 1–8 carbon alkyl, or aralkyl;
a has a value in the range of about 50–1,000;
b has a value in the range of about 500–10,000.

2. A printing plate according to claim 1 wherein the triblock polymer has the structure ABA.

3. A printing plate according to claim 1 wherein the triblock polymer has the structure A'BA'.

4. A printing plate according to claim 1 where $R^3$ is H.

5. A printing plate according to claim 1 where $R^3$ is methyl.

6. A printing plate according to claim 1 where A' is quaternized poly(4-vinylpyridine), $R^2$ is methyl; X is iodide or bromide; $R^3$ is H or methyl; a is about 70–475; and b is about 1200–6000 where $R^3$ is H and is about 1000–5000 where $R^3$ is methyl.

7. A printing plate according to claim 1 wherein the photosensitive unsaturated compound is hexanediol dimethacrylate.

* * * * *